(12) United States Patent
Disser et al.

(10) Patent No.: US 7,676,286 B2
(45) Date of Patent: Mar. 9, 2010

(54) FAIL-SILENT NODE ARCHITECTURE

(76) Inventors: Robert J. Disser, 804 Westminster Pl., Dayton, OH (US) 45419; Paul M. Degoul, 7 rue Ernest Cresson 75014, Paris (FR); Steven L. Tracht, 7431 Oceola Farms Ct., Howell, MI (US) 48855

( * ) Notice: Subject to any disclaimer, the term of this patent is extended or adjusted under 35 U.S.C. 154(b) by 686 days.

(21) Appl. No.: 11/303,563

(22) Filed: Dec. 16, 2005

(65) Prior Publication Data

US 2006/0162986 A1 Jul. 27, 2006

Related U.S. Application Data

(60) Provisional application No. 60/637,565, filed on Dec. 20, 2004, provisional application No. 60/657,010, filed on Feb. 28, 2005.

(51) Int. Cl.
*G05B 15/00* (2006.01)
*G06F 7/00* (2006.01)
*G06F 11/00* (2006.01)

(52) U.S. Cl. .................. 700/82; 700/3; 700/4; 700/19; 700/20; 714/2; 714/13; 701/39; 701/76; 701/107; 303/20

(58) Field of Classification Search ............... 700/9–10, 700/19–21, 81, 2–4, 82; 180/402; 701/70, 701/39, 43, 62, 76, 107; 714/1–3, 10, 11–13, 714/5; 711/162; 712/31
See application file for complete search history.

(56) References Cited

U.S. PATENT DOCUMENTS

| | | | | |
|---|---|---|---|---|
| 5,008,805 A | * | 4/1991 | Fiebig et al. | 700/79 |
| 5,815,649 A | * | 9/1998 | Utter et al. | 714/6 |
| 6,189,981 B1 | * | 2/2001 | Niedermeier | 303/20 |
| 6,213,567 B1 | * | 4/2001 | Zittlau et al. | 303/20 |
| 6,308,282 B1 | * | 10/2001 | Huang et al. | 714/4 |
| 6,345,225 B1 | * | 2/2002 | Bohm et al. | 701/70 |
| 7,290,170 B2 | * | 10/2007 | Anderson et al. | 714/11 |
| 2001/0026098 A1 | * | 10/2001 | Hackl | 303/167 |
| 2005/0225165 A1 | * | 10/2005 | Naik et al. | 303/20 |
| 2006/0015231 A1 | * | 1/2006 | Yoshimura et al. | 701/48 |
| 2006/0253726 A1 | * | 11/2006 | Kukshya et al. | 714/4 |

\* cited by examiner

*Primary Examiner*—Paul L Rodriguez
*Assistant Examiner*—Sheela Rao
(74) *Attorney, Agent, or Firm*—Dickinson Wright PLLC (57) ABSTRACT

A system including a node, wherein the node includes two separate controllers, each of which is configured to output data to a bus, or receive data from a bus, or output data to and receive data from a bus. At least one controller is configured to monitor the output of the other controller and is configured such that if the at least one controller determines that the other controller is providing improper data or signals, at least part of the output data of the other controller is nullified, overridden or superseded by an output from the at least one controller.

39 Claims, 9 Drawing Sheets

FAIL-SILENT NODE ARCHITECTURE

This application claims priority to U.S. Provisional App. Ser. No. 60/637,565, filed Dec. 20, 2004, and U.S. Provisional App. Ser. No. 60/657,010, filed Feb. 28, 2005. The entire contents of both of these applications are hereby incorporated by reference.

The present invention is directed to a fail silent node architecture, and more particularly, to a fail silent node architecture for use with an event triggered bus or a time-triggered bus.

BACKGROUND

Electromechanical brake systems are attracting increasing interest for use in and with motor vehicles. Because such electromechanical brake systems may rely exclusively upon electromechanical systems to control the brakes, these systems typically include significant redundancies and backups. For example, electromechanical brake systems may have a central controller and a plurality of remote controllers, with each remote controller being associated with a brake control subsystem (i.e., located at the corner of the vehicle). Each of the controllers may be coupled to a bus, such as an event triggered bus or a time triggered bus, to provide communication by and between the various controllers. Accordingly, there is a need for a fail-silent node architecture for use with systems or controllers that are coupled to a bus.

SUMMARY

In one embodiment, the present invention is a fail-silent node architecture for use with nodes that are coupled to a bus, such as an event triggered bus or a time triggered bus. In particular, in one embodiment the invention is a system including a node, wherein the node includes two separate controllers, each of which is configured to output data to a bus, or receive data from a bus, or output data to and receive data from a bus. At least one controller is configured to monitor the output of the other controller and is configured such that if the at least one controller determines that the other controller is providing improper data or signals, at least part of the output data of the other controller is nullified, overridden or superseded by an output from the at least one controller.

DETAILED DESCRIPTION

Figure 1:
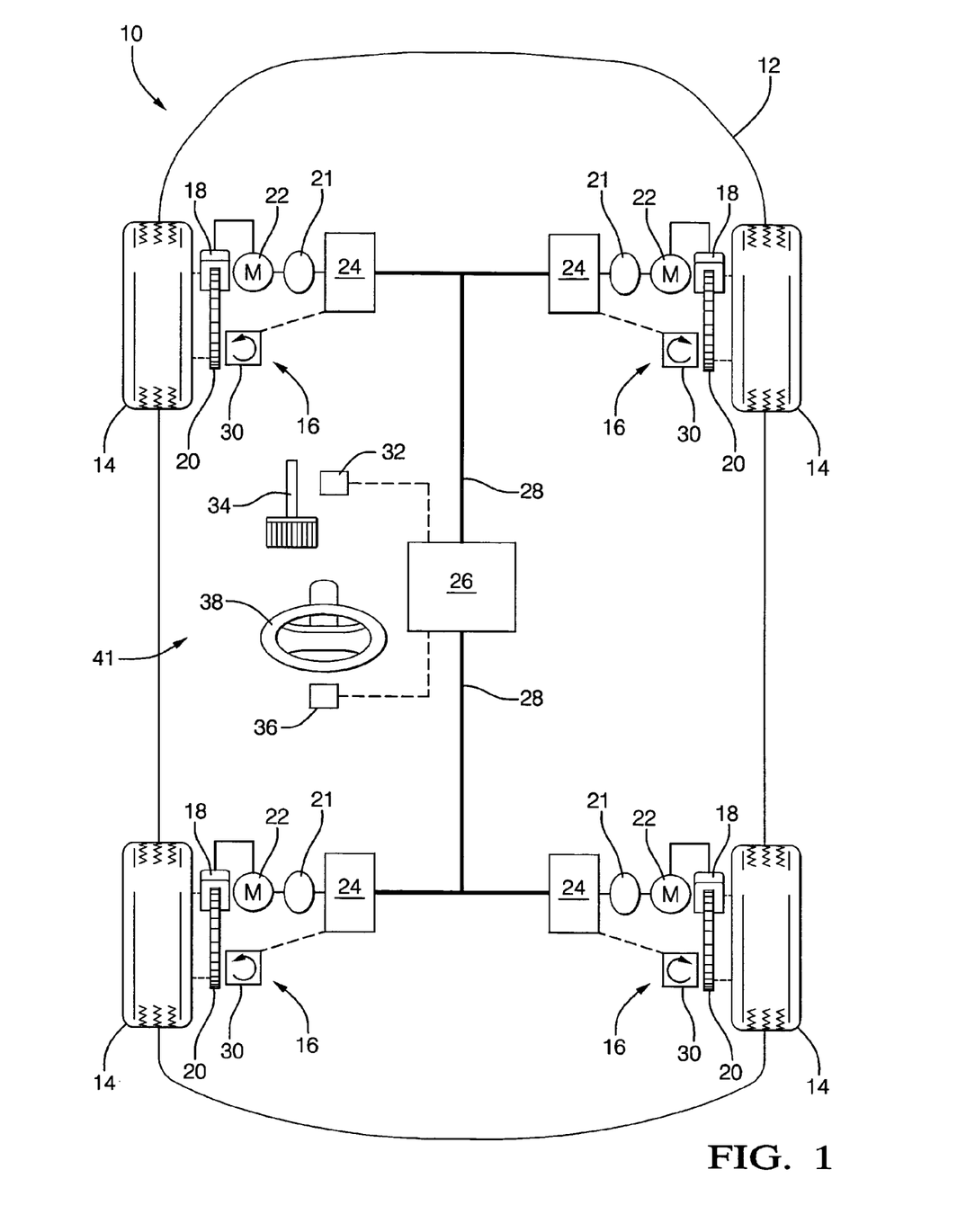
FIG. 1 is a schematic representation of a motorized vehicle utilizing various controllers.

The node architecture of the present invention may be implemented in a vehicle 10 having a vehicle body 12, as shown in FIG. 1. The vehicle 10 includes a set of wheels 14 with each wheel 14 being located at or adjacent to a corner of the vehicle 10. Each wheel 14 may include a brake subsystem 16, such as an electromechanical brake system. Each brake subsystem 16 may include a caliper 18 and a rotor 20 rotationally coupled to the associated wheel 14. Each caliper 18 is operatively coupled to a motor 22 such that the motor 22 can be operated to cause the caliper 18 to be displaced to cause a brake pad located thereon (not shown) to engage the rotor 20 and cause braking and deceleration of the vehicle 10 in a well-known manner. The invention may be implemented in vehicles utilizing a wide variety of braking systems, including braking system utilizing drum brakes and/or disk brakes, as well as other types of brakes. However, for discussion purposes below the vehicle 10 will be assumed to utilize disk brakes.

Each brake subsystem 16 may further include a remote controller or corner controller 24 located adjacent to or associated with a wheel 14 to control the brake forces applied to that wheel 14. In particular, each corner controller 24 is coupled to motor driver 21, which is in turn coupled to the associated motor 22. Each corner controller 24 can provide signals/instructions to the associated motor driver 21, which in turn converts the signals/instructions into electrical signals/instructions which are fed to the motor 22 such that each corner controller 24 can control movement and actuation of the associated motor 22/motor driver 21.

Each corner controller 24 may be coupled to a central controller 26 and to the other corner controllers 24 or to other additional controllers (not shown) or as part of a larger system. Each controller 24, 26 may be or include any of a wide variety of controllers, microcontrollers, electronic control units ("ECU"), processors, chips, logic circuitry, or the like, but is termed a "controller" herein to encompass all of these terms and structures. The vehicle 10 may include a bus 28 that can receive and transfer data to and from each of the controllers 24, 26. The bus 28 may take any form capable of transferring a signal or data, including electrical, optical, or radio signals and may include and employ various technologies in its implementation, such as wired, wireless, fiber optic, and the like, including combinations thereof. In this manner, each of the corner controllers 24 and/or central controller 26 have the ability to control and/or monitor and/or communicate with the other controllers 24, 26.

Each of the controllers 24, 26 receive data relating to various conditions and components of the vehicle 10. For example, FIG. 1 shows a plurality of wheel speed sensors 30, with each wheel speed sensor 30 being located adjacent to a wheel 14 and providing its output to an associated, adjacent corner controller 24. FIG. 1 also illustrates a brake pedal sensor 32 configured to determine the displacement/position of a brake pedal 34, and a steering wheel sensor 36 to determine the position of the steering wheel 38. The brake pedal sensor 32 and steering wheel sensor 36 are both coupled to the central controller 26. However, the vehicle/system may include a variety of sensors (not shown) that track a variety of vehicle/system conditions, such as vehicle speed, vehicle heading, slip conditions of a wheel, longitudinal and lateral acceleration, yaw, etc. The various sensors may be directly coupled to each or selected ones of the controllers 24, 26 to provide their output signals thereto. Each controller 24, 26 may then process the data received from the sensors.

Each remote controller 24 may receive inputs from the central controller 26 via the bus 28, and may carry out various calculations and provide data or information to the other remote controllers 24 and/or to the central controller 26 via the bus 28. For example, each remote controller 24 may be configured to carry out a base brake pedal control function, dynamic rear proportion control functions, force control functions, active suspension control functions, ABS control functions, and the like. By way of example, base brake control function involves receiving the processed output from the brake pedal sensor 32 via the central controller 26 and determining the deceleration or braking action requested by the driver, and also determining the action required to provide the desired deceleration or braking.

For example, the base brake function may involve determining the force to be applied by the caliper 18 to its brake pad (or from the brake pad to the rotor 20) to achieve the braking/deceleration requested by the driver. Each remote controller 24 may include a base brake module to process the output of the sensor 32/central controller 26 and determine how to control or operate the associated motor driver 21, motor 22 and/or caliper 18. Each remote controller 24 and central controller 26 may also include a voting module which communicates to the other remote controllers 24 and the central controller 26 via the bus 28, and which receives output from the voting modules of the other controllers 24, 26 via the bus 30. The voting modules provide redundancy in the system and allow "consensus building" in determining control over the brake subsystems 16.

For example, for each function carried out by each remote controller 24 (i.e., base brake control, dynamic rear proportional control, force control active suspension, ABS and any other functions), each remote controller 24 may carry out these functions/calculations for its associated wheel/brake subsystem 16 as well as the three other wheels/brake subsystems 16. As an illustrative example, upon receiving inputs from the brake pedal sensor 32/central controller 26, the right front remote controller 24 will determine the force to be applied by the right front brake subsystem 16 to match the driver input based upon the sensed travel and/or force of the brake pedal 34. The right front remote controller 24 will then determine how many rotations of its associated motor 22 is required to apply the desired braking force to the right front wheel 14. The right front remote controller 24 will then communicate this output to the other remote controllers 24 via the bus 28.

The other remote controllers 24 (i.e. the left front controller and both rear controllers) will have also calculated the required force and motor control for the right front wheel/brake subsystem. The system 41 then undertakes a voting process to determine the required force and motor control for the right front wheel/brake. Thus the action to be taken is determined by the remote controllers 24 in a voting process. If all four remote controllers 24 agree, or three out of the four remote controllers 24 agree, then the agreed-upon values are utilized for further processing (i.e., the signals are forwarded to the motor driver 21 and motor 22 of the right front brake subsystem 16 to implement the braking action). If only two of the four remote controllers 24 agree, then the agreed-upon values may be utilized. If there is no agreement by any of the remote controllers 24, then the system and/or selected remote controllers 24 may be shut down. The process is then repeated, or carried out simultaneously, for the other three wheels of the vehicle 10 to determine what sort of braking action is required at each wheel/brake subsystem.

Each controller 24, 26 may be considered to be a node such that input data flows into the node and output data flows out. It may be desired for each node 24, 26 to have a fail-silent structure or architecture such that each controller or node 24, 26 outputs valid data, or outputs no data at all. Accordingly, the node architectures outlined below may be utilized or incorporated into each of the controllers 24, 26 used in the motorized vehicle 10, and more particularly, utilized or incorporated into the controllers 24, 26 of an electromechanical (i.e., brake-by-wire) system.

However, it should be understood that the node architecture disclosed herein may be utilized in or incorporated into nearly any vehicle controller, such as steering (i.e. steer-by-wire) controllers, throttle-by-wire controllers, active suspension controllers or the like. In addition, the invention and node architecture discussed herein is not necessarily limited to use with controllers utilized in automobiles or motorized vehicles, and could be used in any system utilizing nodes or controllers that provide an output.

The invention and node architecture can be used in conjunction with any of a wide variety of buses and bus structures. For example, the bus 28 can be a data bus line and can have a variety of configurations or topologies, including a star configuration, a ring configuration, or other bus configurations. The bus 28 may utilize or incorporate an event triggered protocol in which case the bus 28 may be, for example, a CAN (controller area network) data bus line, a VAN (vehicle area network) data bus line, or the like. Alternately, the main bus 20 may utilize or incorporate a time-triggered protocol. In this case the bus 20 may be, for example, a FLEXRAY® data bus line sold by DaimlerChrysler of Stuttgart Germany (and which is believed to incorporate standards set by a consortium of many members), or a TTP/C bus, or a TTCAN bus sold by Bosch/Infineon of Stuttgart, Germany, or a TITAN® bus sold by Titan Corporation of San Diego, Calif., or the like. Thus the bus 28 may be considered a communication device that is separate and/or spaced apart from the nodes 24, 26 for providing communication between distributed nodes, as contrasted with hard-wired circuitry on a chip or the like.

The case where the bus 28 is an event triggered bus is described first. The event-triggered protocol nature of the bus 28 allows each controller 24, 26 to transmit its data to the bus 28, and thereby to the other controllers 24, 26, when that controller 24, 26 is ready to transmit the data. The bus 28 may include or utilize a non-destructive arbitration mechanism to handle and allocate the transmission of data when more than one controller 24, 26 attempts to transmit data to the bus 28 at the same time. When each controller 24, 26 is not transmitting data, that controller 24, 26 is in a "listening" state and receives data placed on the bus 28 by the other controllers 24, 26.

Figure 2:
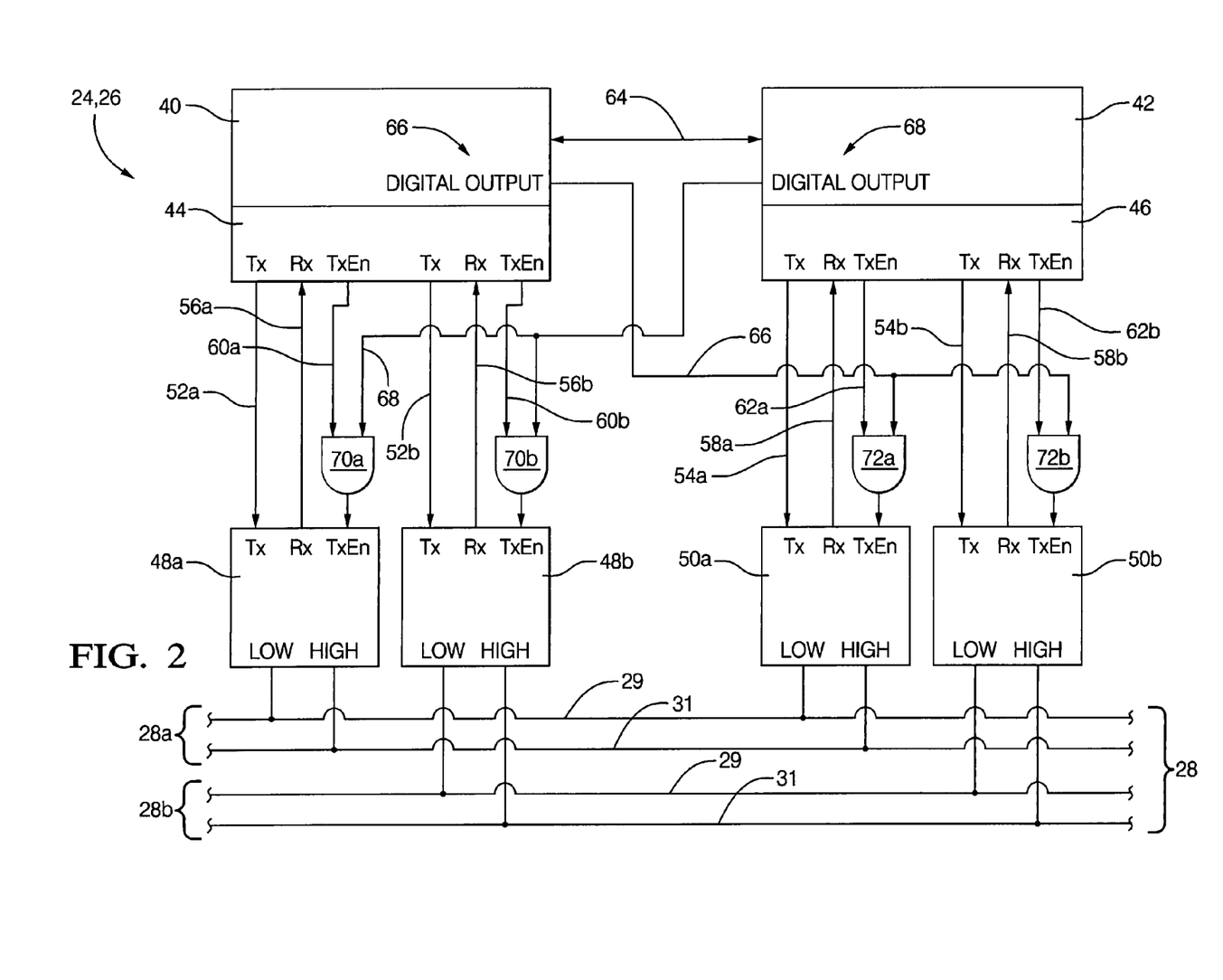
FIG. 2 is a schematic representation of a node coupled to a dual channel bus and utilizing a double interface and dual outputting controllers.

The system of FIG. 2 utilizes a dual microcontroller architecture wherein each node 24, 26 includes a main controller 40 and a supervisory or supplemental controller 42. Each of the main 40 and supervisory 42 controllers independently receive data (i.e., travel of the brake pedal 34, speed of the wheels 14, position of the steering wheel 38, etc.) from each of the relevant vehicle sensors (i.e., the brake pedal sensor 32, wheel speed sensors 30 or steering wheel sensor 36) via the bus 28. The main 40 and supervisory 42 controllers may then each independently process the input data and provide output data or signals (i.e., determining whether the brake motor 22 at any of the wheels 14 should be activated to cause braking force to be applied to the associated wheel 14).

The main controller 40 and supervisory controller 42 each include, or are coupled to, an associated communication controller 44, 46 which accumulates or receives data provided from the associated main 40 or supervisory 42 controller. Each communication controller 44, 46 may be physically integrated with its associated main 40 or supervisory 42 controller. In this case each communication controller 44, 46 could be located on the same integrated chip as its associated controller 40, 42 and the communication controllers 44, 46 are considered internal peripherals. Alternately, each communication controller 44, 46 is physically separated from its associated main 40 or supervisory 42 controller, in which case each communication controller 44, 46 could be functionally integrated with its associated main 40 or supervisory 42 controller.

The main controller 40 and/or its communication controller 44 is coupled to a pair of communication transceivers (or bus drivers) 48a, 48b which are, in turn, coupled to the bus 28. The communication controller 44 is connected to the associated transceivers 48a, 48b by a pair of transmit ("Tx") lines 52a, 52b. The transmit lines 52a, 52b transmit signals or data from the communication controller 44 (or associated main controller 40) to the transceivers 48a, 48b and thereby to the bus 28.

The communication controller 44 is also coupled to the associated transceivers 48a, 48b by a pair of receive ("Rx") line 56a, 56b. Each receive line 56a, 56b transmits signals or data from the transceivers 48a, 48b (and from the bus 28) to the communication controller 44 (or associated main controller 40). The communication controller 44 also transmits "transmit enable" ("TxEn") signals to the associated transceivers 48a, 48b via a pair of transmit enable lines 60a, 60b.

When the main controller 40 seeks to provide its data to the bus 28 (i.e., for voting, data transmission, etc.), the associated communication controller 44 sends an appropriate signal over the associated transmit enable signal lines 60a, 60b. The transmit enable signal is attempted to be sent to the associated transceivers 48a, 48b to signal that the communication controller 44 is or will transmit data over the transmit lines 52a, 52b for forwarding to the bus 28.

More particularly, when a communication controller 44 seeks to transmit data, the associated enable lines 60a, 60b may be switched to an "on" state. In one case, a digital signal of "1" or a high signal may be transmitted on the associated transmit enable lines 60a, 60b. Upon receipt of this high signal via the transmit enable lines 60a, 60b, the associated transceivers 48a, 48b understand that the transceivers 48a, 48b will receive data via the transmit lines 52a, 52b for forwarding to the bus 28. The communication controller 44 then transmits (over the associated transmit lines 52a, 52b) the data stored in the communication controller 44. The data transmitted over the transmit lines 52a, 52b is then received in the appropriate transceivers 48a, 48b for transmission or forwarding to the bus 28.

The output of the main controllers 40 that is provided to the associated communication controller 44 and then forwarded to the appropriate transceivers 48a, 48b is typically in the form of bits, or a data stream of "1"s and "0"s. The bus 28 may include a pair of discrete channels (termed "Channel A" 28a and "Channel B" 28b). Each of Channel A 28a and Channel B 28b of the main bus 28 includes a low signal line 29 and a high signal line 31 which transmits data to and from the transceivers 48a, 48b.

The normal or default output of each low line 29 can be a high signal or a "1," and the normal or default output of each high line 31 can be a low signal or a "0." In this case, when the transceiver 48a needs to transmit a "1" via Channel A 28a, the low line 29 of Channel A is switched or pulsed to "low" or "0" and the high line 31 is simultaneously switched or pulsed to "high" or "1" to transmit the "1." Conversely, when the transceiver 48a needs to transmit a "0" over Channel A, the low line 29 of Channel A is switched or pulsed to "high" and the high line 31 is simultaneously switched or pulsed to a low level.

Alternately, the default output of the low line 29 and the high line 31 may be a middle voltage such as, for example, 2.5 volts. In this case, the default state of the bus 28 transmits a digital "0." When the transceiver 48a needs to transmit a "1" to the data bus 28, the high line 31 is switched to a relatively high voltage, such as 5 volts, while the low line 29 is switched to ground or a relatively low voltage. The low 29 and high lines 31 of the each channel of the bus thereby together provide a relatively strong signal due to the voltage differential of the signals sent by the low lines 29 and high lines 31 which improves the signal-to-noise ratio.

In this manner, transceiver 48a transmits signals from the main controller 40 over Channel A 28a. Transceiver 48b associated with the main controller 40 similarly transmits signals over Channel B 28b. The output of the main controller 40 and its communication controller 44 may thereby be transmitted over two separate, discrete channels of the bus 28. Thus, in the embodiment shown herein, the system utilizes two separate channels or discrete buses 28a, 28b for redundancy. Each of these buses 28a, 28b may be separate and discrete bus systems to ensure sufficient redundancy and robustness to the bus system 28. However, for the sake of discussion herein, both Channel A and Channel B may collectively be considered to be the main bus 28, with the main bus 28 having two separate and discrete channels 28a, 28b.

Although the bus system 28 is illustrated as having two channels 28a, 28b, additional channels could be utilized. For example, a third channel (i.e., "Channel C"; not shown) could include its own separate wire(s) or bus system, or could utilize components of Channels A and B to create a third channel that is logically separated from Channels A and B. In addition, the system may be utilized with a simplified communication protocol including only a single channel (i.e., Channel A), as will be described in greater detail below.

After the communication controller 44 is finished transmitting its data over the bus 28, the associated transmit enable lines 60a, 60b are switched to an "off" state. For example, at this time a digital signal of "0," or a low signal, may be transmitted on the associated transmit enable lines 60a, 60b to prevent data from being transferred from the communication controller 44 to the transceivers 48a, 48b and to the bus 28. Thus, when the received transmit enable signal is high (i.e., 1), the associated transmit lines 52a, 52b are allowed to transfer data to the transceivers 48a, 48b and to the bus 28. In contrast, when the received transmit enable signal is low (i.e., 0), the transfer of data over the transmit lines 52a, 52b is blocked.

The receive lines 56a, 56b are "on" and the transmit lines 52a, 52b are "off" the majority of the time so that the controller 40 is in a listening state. In this case, any data received by the transceivers 48a, 48b via the bus 28 are forwarded to the associated communication controller 44 and thereby the main controller 40. As the main controller 40 generates data to be provided to the bus 28, the data is forwarded to the associated communication controller 44 for forwarding to the bus 28.

The supervisory controller 42 is configured in a manner analogous to the main controller 40. In particular, the supervisory controller 42 includes a communication controller 46, which is coupled to a pair of transceivers 50a, 50b via a pair of transmit lines 54a, 54b, a pair of receive lines 58a, 58b and a pair of transmit enable lines 62a, 62b. The supervisory controller 42 can transmit data to the bus 28 in the same manner as the main controller 40 (i.e., by sending the appropriate signals via the transmit enable lines 62a, 62b and transmitting data via the transmit lines 54a, 54b). The supervisory controller can also receive data via its receive lines 58a, 58b in a manner analogous to the main controller 40.

When the received transmit enable signals 62a, 62b are high, the associated transmit lines 54a, 54b are allowed to transfer data to the transceivers 50a, 50b and to the bus 28. In contrast, when the received transmit enable data 62a, 62b is low, the transfer of data over the transmit lines 52a, 52b is blocked. In the illustrated embodiment, the supervisory controller 42 has full access to the bus 28 to transfer and receive data.

It should be noted that data transmissions from main controller 40 and supervisory controller 42 may take place at different times. Thus, when the main controller 40 transmits a high digital signal over the transmit enable lines 60a, 60b, and transmits data over the transmit lines 52a, 52b, the supervisory controller 42 typically is not providing data to the bus 28. Conversely, when the supervisory controller 42 transmits a high digital signal over its transmit enable lines 62a, 62b and transmits data over its transmit lines 54a, 54b, the main controller 40 is typically not providing data to the bus 28.

Each controller 40, 42 can be considered to be directly coupled to the bus 28. Although the communication controllers 44, 46 and transceivers 48, 50 may be interposed between the bus 28 and the controllers 40, 42, such an arrangement can still be considered to constitute a direct connection since the communication controllers 44, 46 and transceivers 48, 50 merely facilitate communication between the controllers 40, 42 and the bus 28, and there are no other controllers located between each controller 40, 42 and the bus 28.

In order to provide a node 24, 26 that is fail-silent in nature, the main controller 40 and supervisory controller 42 monitor the output of each other. If one controller 40, 42 determines that the other controller 40, 42 is outputting invalid or improper data, that controller 40, 42 is shut down by an output of the other. In other words, the output of the main controller 40 can be silenced, turned off, overridden or superseded by the supervisory controller 42, and the output of the supervisory controller 42 can be similarly controlled by the main controller 40.

The main controller 40 and supervisory controller 42 may be directly coupled by a serial peripheral interface ("SPI") bus 64 to provide all or part of their outputs to each other. In addition, when the output of a main 40 or supervisory 42 controller is placed on the bus 28, the other controller can monitor that data by its receive lines 56a, 56b or 58a, 58b.

Thus, the output information of the controllers 40, 42 may be monitored/validated by each other by either the SPI bus 64 or by information placed on the bus 28. Reviewing information provided on the bus 28, as opposed to exchanging information by the SPI bus 64, may be more efficient due to limited bandwidth of the SPI bus 64. In addition, the controllers 40, 42 can be coupled by other means, such as parallel busses, dual port RAM ("DPRAM") and the like. Each controller 40, 42 may monitor/validate all of the output or data of the other controller 40, 42, or only part of the output or data.

Each controller 40, 42 can monitor the values of the data provided by the other controller. In addition, each controller 40, 42 can monitor the timing of the data provided on the bus 28 by the other controller. For example, each controller 40, 42 may have an expected timing pattern relating to the timing or manner in which the controller 40, 42 is expected to provide data to the bus 28. If a controller 40, 42 sufficiently deviates from its expected timing pattern, this can be taken as evidence of faulty operation of the controller 40, 42.

In an extreme example relating to the expected timing pattern, a controller 40, 42 may malfunction to the extent that it is providing a constant stream of meaningless data to the bus 28. The monitoring controller 40, 42 may be able to quickly determine that the other controller is malfunctioning due to the length of the data stream being provided to the bus 28 by the malfunctioning controller 40, 42. The monitoring controller 40, 42 can then take steps to shut down or override the malfunctioning controller. It may be particularly important to shut down a malfunctioning controller that provides a constant stream of bad data since this malfunctioning controller could essentially monopolize the bus 28 and prevent other controllers and components from communicating via the bus 28. In this sense the system monitors data in both the time domain and value domain to determine the good/bad status of a controller 40, 42.

In order to implement the supervisory control over the main controller 40, the supervisory controller 42 includes an agreement signal or a digital output 68 coupled to a pair of AND gates 70a, 70b. Each transmit enable line 60a, 60b of the main controller 40 is also coupled to the input of the associated one of the AND gates 70a, 70b. The output of each AND gate 70a, 70b is fed to an associated transceiver 48a, 48b where the transceivers 48a, 48b are configured to receive the transmit enable signals 60a, 60b.

The AND gates 70a, 70b are configured such that the output of the AND gates 70a, 70b are a digital low signal, or a "0," unless both of the inputs are digital high signals or "1"s. The default output for the digital output 68 is normally a benign signal (with respect to an AND gate), for example a digital "1." Thus, when the main controller 40 seeks to upload its data to the bus 28, the transmit enable lines 60a, 60b switch to a "1" as outlined above. When the digital output 68 is also a "1," the output of the AND gates 70a, 70b are "1"s and transmission from the communication controller 44 to the transceivers 48a, 48b is enabled.

This arrangement of the digital output 68 and the AND gates 70a, 70b allows the supervisory controller 42 to essentially shut down the main controller 40 when necessary. For example, the supervisory controller 42 may determine that the main controller 40 is malfunctioning and has outputted or is outputting invalid data based upon the independent calculations or review of the supervisory controller 42.

In this case, the supervisory controller 42 sends an appropriate signal via its digital output 68 (for example, the digital output 68 of the supervisory controller 42 may change from a "1" to a "0"). In this case, when the main controller 40 or its communication controller 44 attempts to upload its data to its transceivers 48a, 48b, its transmit enable lines 60a, 60b are switched to a "1" as per the standard procedure for uploading or seeking to upload data. However, because the digital output 68 of the supervisory controller 42 is a "0," the output of the AND gates 70a, 70b remains a "0". Thus, the signals received in the transceivers 48a, 48b remains a "0" thereby instructing the transceivers 48a, 48b to block or ignore any transmission of data over the associated transmit lines 60a, 60b.

This state of shutdown of the main controller 40 continues so long as the digital output 68 of the supervisory controller 42 remains a "0". In this manner, the digital output 68 of the supervisory controller 42 can override the transmit enable signals 60a, 60b from the communication controller 44 and essentially shuts down the main controller 40 to ensure that no data is transmitted by its transmit lines 52a, 52b. Thus, communication from the main controller 40 to the bus 28 is enabled only if: 1) its communication controller 44 is in a transmit state, and 2) the supervisory controller 42 enables the transmission via its digital output 68.

In the embodiment of FIG. 2, the node 24, 26 is similarly configured to allow the main controller 40 to block/enable transmissions or outputs of the supervisory controller 42. For example, the main controller 40 includes an agreement signal or digital output 66 which is coupled to a pair of AND gates 72a, 72b. Each AND gate 72a, 72b receives the input of a transmit enable signal 62a, 62b from the supervisory controller 42/communication controller 46. The output of the AND gates 72a, 72b are fed to the associated transceivers 50a, 50b where the transceivers 50a, 50b are configured to receive transmit enable signals 62a, 62b.

When the main controller 40 determines that the calculations of the supervisory controller 42 are incorrect or invalid, and/or that the supervisory controller 42 is outputting bad signals, the digital output 66 of the main controller 40 sends a signal to the AND gates 72a, 72b (i.e. a low signal) to override the transmit enable signals 62a, 62b from the communication controller 46 and essentially shuts down the supervisory controller 42. In this manner, each controller 40, 42 can shut down the output of the other controller when it is determined that the other controller is malfunctioning or outputting bad data.

Thus, the digital output 66, 68 of each controller 40, 42 is a signal indicating whether that controller 40, 42 believes there is agreement (i.e., within a specified range) or disagreement (within a specified range) between the main 40 and supervisory 42 controllers. If that controller 40, 42 believes there is disagreement, its digital output 66, 68 causes the signal fed to the transceivers 48a, 48b, 50a, 50b to indicate data transfer over the appropriate transmit lines 52a, 52b, 54a, 54b should be blocked or ignored. In this manner, each node 24, 26 is fail-silent to ensure that each node or controller 24, 26 provides the correct output or command, or does not provide any output or command to provide fail silence in the value domain.

When the supervisory 42 or main 40 controller "shuts down" the other controller 40, 42, this may be a partial shut down in that the processing functions related to the invalid data may be the only functions that are shut down. For example, if the supervisory controller 42 determines that the main controller 40 has outputted invalid data relating to high-level braking control (i.e., ABS control), the supervisory controller 42 may shut down the functions of the main controller 40 relating to those braking functions, but allow the main controller 40 to continue to provide data relating to other subsystems, such as, for example, basic brake commands, active suspension control, or the like. Thus, although each node or controller 24, 26 may be a fail silent node, specific or selective processing of the output of a node 24, 26 may allow a node 24, 26 to operate in a fail-operational or fail-silent manner.

The supervisory controller 42 may have the same processor or processing capabilities as the main controller 40. In addition, the supervisory controller 42 may run the same processing algorithms or carry out the same calculations upon the raw data as the main controller 40. In this case, the main controller 40 and supervisory controller 42 form a symmetrical configuration. Alternately, the node 24, 26 may have an asymmetric configuration in which the supervisory controller 42 may have reduced processing power and may run simplified versions of the algorithms and calculations run by the main controller 40. The symmetric arrangement provides good fault coverage and a fast detection time, whereas the asymmetrical system may be cheaper but fault coverage could be less complete.

It can be seen that both the main controller 40 and the supervisory controller 42 upload data to the bus 28. Although the supervisory controller 42 may run the same or simplified algorithms as the main controller 40, the data provided by the supervisory controller 42 to the bus 28 may not necessarily be the same data as the main controller 40. For example, the main controller 40 could provide data or signals relating to part of the system to be controlled (i.e. provide instructions regarding the braking systems for the two front wheels) and the supervisory controller 42 could provide data or signals relating to another part of the system to be controlled (i.e. provide instructions regarding the braking systems for the two rear wheels).

Figure 3:
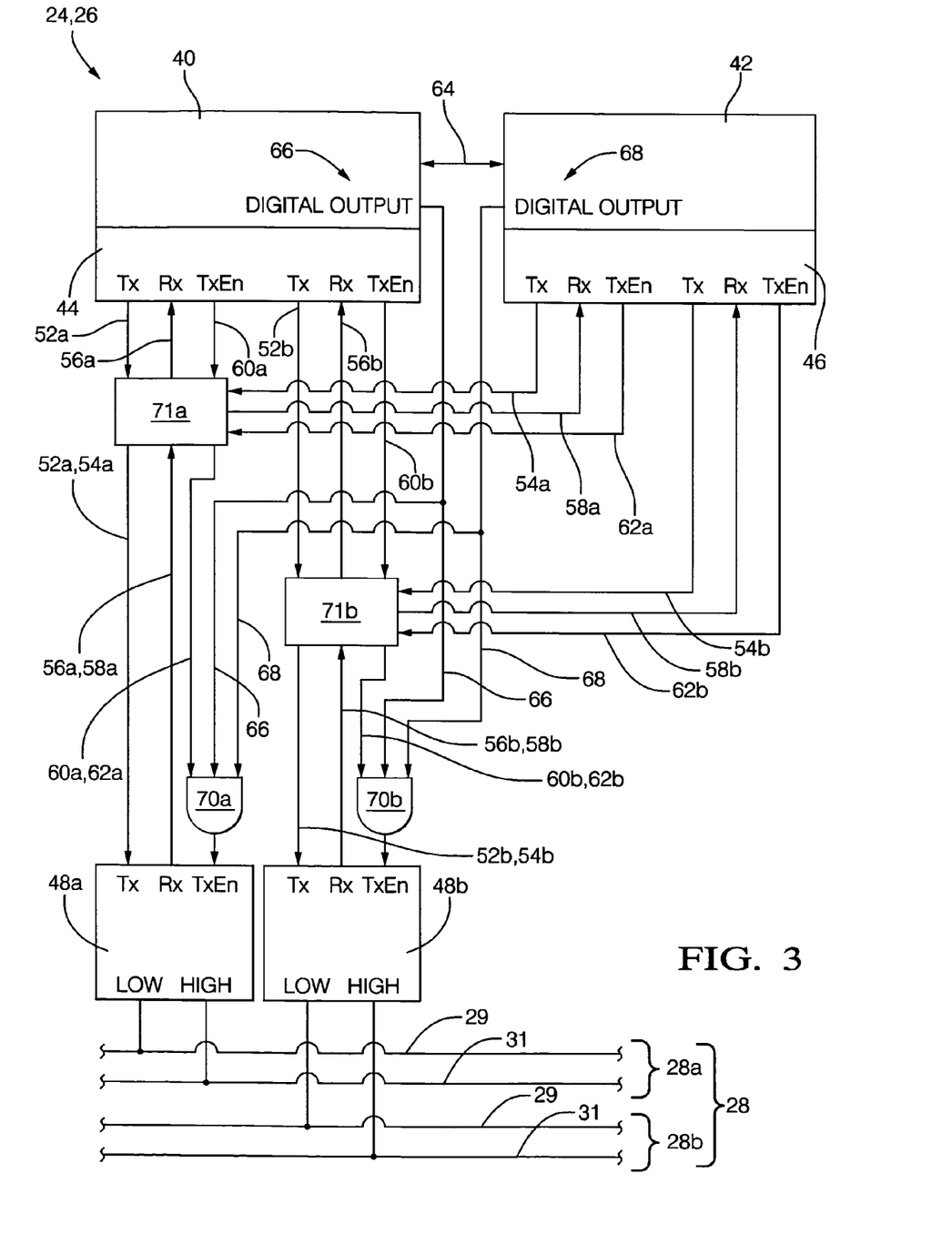
FIG. 3 is a schematic representation of a node coupled to a dual channel bus and utilizing a single interface and dual outputting controllers.

The bus interface presented by the node 24, 26 of FIG. 2 is a double interface in that each of the main 40 and supervisory 42 controllers has full and independent access to the bus 28. The system of FIG. 3 is similar to that of FIG. 2, with the exception that only two transceivers 48a, 48b have full access to the bus 28, and therefore a single interface (to each channel) is provided. In addition, only a pair of AND gates 70a, 70b are utilized. Because the main controller 40 and supervisory controller 42 transmit information at different times, the output of the main 40 and supplemental 42 controllers can be relatively easily configured to be transmitted by the single interface of FIG. 3.

In particular, as shown in FIG. 3, all of the outputs from and inputs to the supervisory controller 42 and its associated communication controller 46 for Channel A 28a are fed to a digital logic block 71a. Each of the outputs from and inputs to the main controller 40 and its associated communication controller 44 for Channel A are also fed to the digital logic block 71a. Similarly, all of the outputs to and from the supervisory controller 42 and main controller 40 for Channel B are fed to digital logic block 71b.

For example, when the main controller 40 is transmitting or attempting to transmit data over Channel A (i.e., its transmit enable line 60a is high), the digital logic 71a forwards the high transmit enable data from the communication controller 44 to the AND gate 70a via a combined transmit enable line 60a, 62a. Similarly, the data from the main controller 40 for Channel A from transmit line 52a is forwarded to the transceiver 48a via the combined transmit line 52a, 54a.

Data to be transmitted from the bus 28 to the main controller 40 is routed from the combined receive lines 56a, 58a to receive line 56a via the digital logic block 71a. The digital logic block 71a associated with Channel A also routes signals to and from the supervisory controller 42 in a similar manner. Thus, when the supervisory controller 42 is transmitting or attempting to transmit data to Channel A, the digital logic 71a forwards the high transmit enable data from the supervisory controller 42 to the AND gate 70a via the combined transmit enable line 60a, 62a, and the data from the supervisory controller 42 is forwarded to the transceiver 48a via the combined transmit line 52a, 54a.

Digital logic block 71b associated with Channel B operates in a similar manner. Thus, the digital logic block 71b keeps each of the signals (i.e., the transmit 52b, 54b, receive 56b, 58b, and transmit enable lines 60b, 62b) logically separate and segregated. The digital logic blocks 71a, 71b thus allows multiplexing of the controllers 40, 42 and the transceivers 48a, 48b. If desired, the digital logic 71 and/or the AND logic 70 may be integrated in the transceivers 48a, 48b.

The combined transmit enable lines 60a, 62a and 60b, 62b exiting the digital logic 71a, 71b are fed to the AND junctions 70a, 70b, respectively. In addition, the digital outputs 66, 68 of both the main controller 40 and the supervisory controller 42 are coupled to the AND gates 70a, 70b. This configuration ensures that if at least one of the main 40 or supervisory 42 controllers disagrees with the other, the outputs of both the main 40 and supervisory controllers 42 are shut down in an analogous manner to the shutdown process outlined above and shown in the embodiment of FIG. 2. However, contrary to the system of FIG. 2, in the embodiment of FIG. 3 if one of the controllers 40, 42 is shut down, the other controller 40, 42 (and indeed the entire node 24, 26) may be shut down.

The system of FIG. 3 provides a single bus interface stage including a pair of transceivers 48a, 48b. The fail-safe nature of the node of FIG. 3 is provided by the AND gates 70a, 70b coupled to the digital outputs 66, 68 and the combined transmit enable lines 60a, 62a and 60b, 62b. The system of FIG. 3 allows both controllers 40, 42 to send and receive data on the bus 28, and provides a simple interface with the bus 28.

Figure 4:
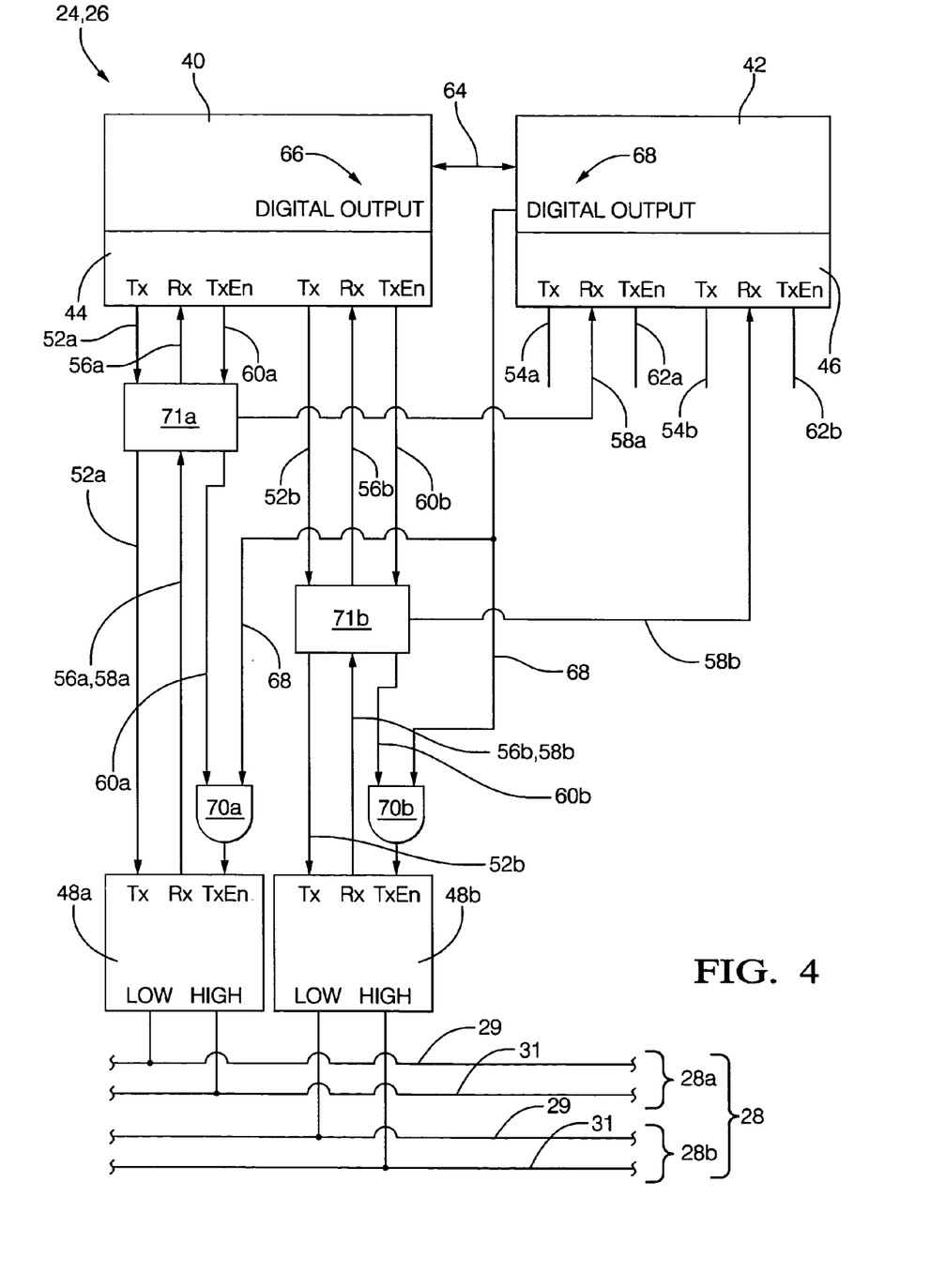
FIG. 4 is a schematic representation of a node coupled to a dual channel bus and utilizing a single interface with two controllers, only one of which is an outputting controller.

The system of FIG. 4 is somewhat of a simplification of the system of FIG. 3. In particular, in this embodiment the main controller 40 is the only controller which transmits data to the bus 28. As can be seen in FIG. 4, the transmit lines 54a, 54b of the supervisory controller 42, as well as the associated transmit enable lines 62a, 62b, are removed, disconnected, or nonexistent.

However, the supervisory controller 42 and its associated communication controller 46 retains its listening capabilities by its receive lines 58a, 58b connected to the digital logic blocks 71a, 71b. Thus, the supervisory controller 42 monitors the output of the main controller 40 by the SPI bus 64 and/or by the data bus 28. If the supervisory controller 42 determines that the main controller 40 is providing invalid data, the supervisory controller 42 sends an appropriate signal via its digital output 68. This digital output 68, when received at the AND gates 70a, 70b and forwarded to the transceivers 48a, 48b can cause the transceivers 48a, 48b to prevent transmission of any data from the communication controller 44 in the desired manner.

The embodiment of FIG. 4 provides a simple bus interface with a single sending controller in the form of the main controller 40. The digital logic blocks 71a, 71b are simplified compared to that in the embodiment of FIG. 3 due to the disablement or nonuse of the transmit lines 54a, 54b and transmit enable lines 62a, 62b of the supervisory controller 42.

Figure 5:
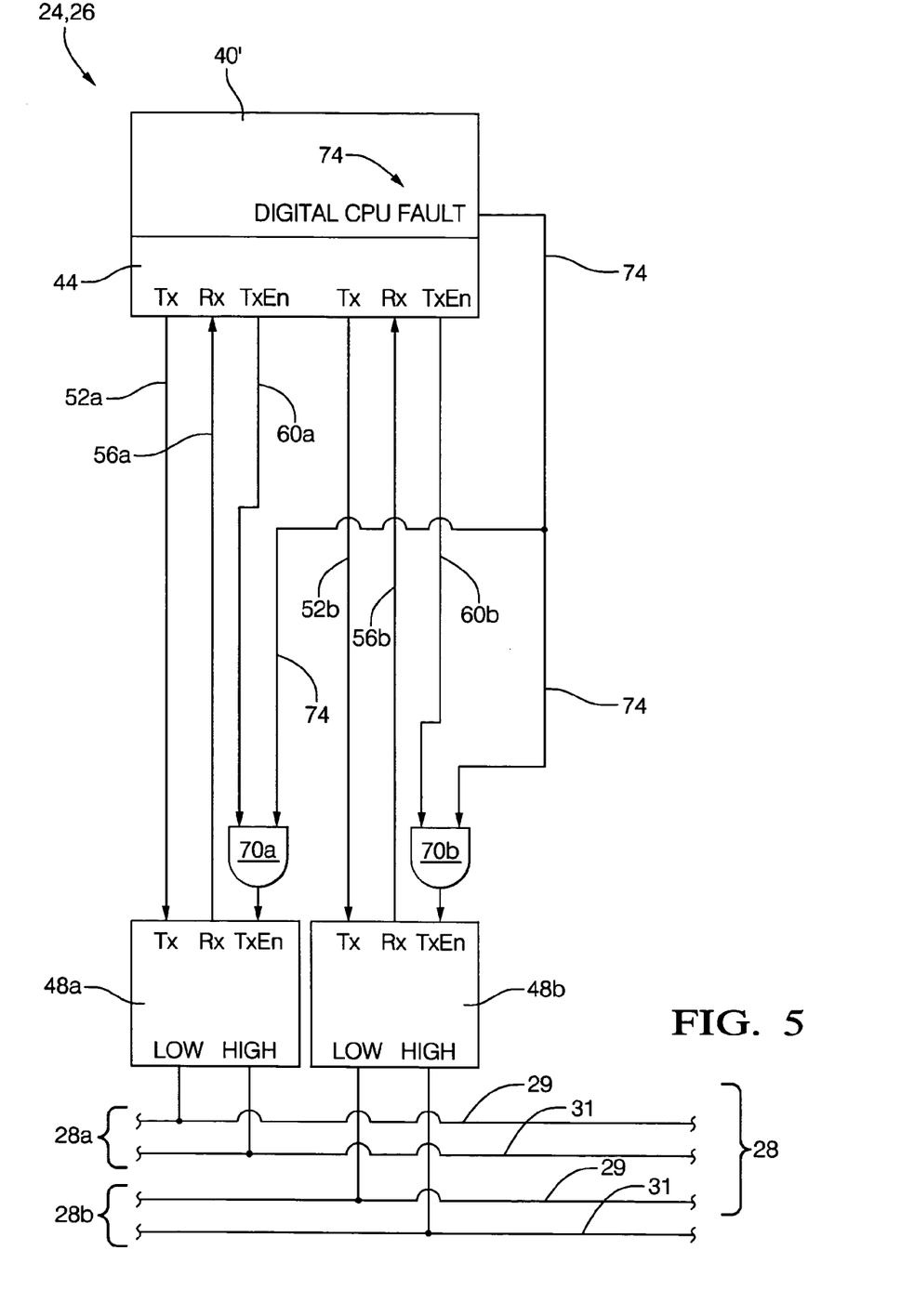
FIG. 5 is a schematic representation of a node coupled to a dual channel bus and utilizing a single interface and a single controller.
Figure 6:
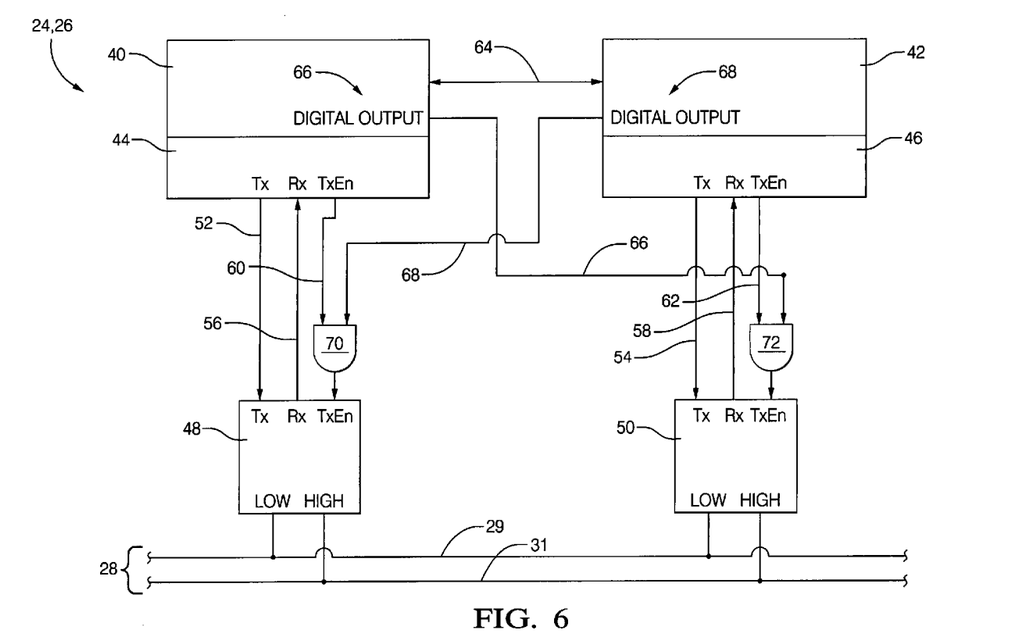
FIG. 6 is a schematic representation of a node coupled to a single channel bus and utilizing a double interface and dual outputting controllers.
Figure 7:
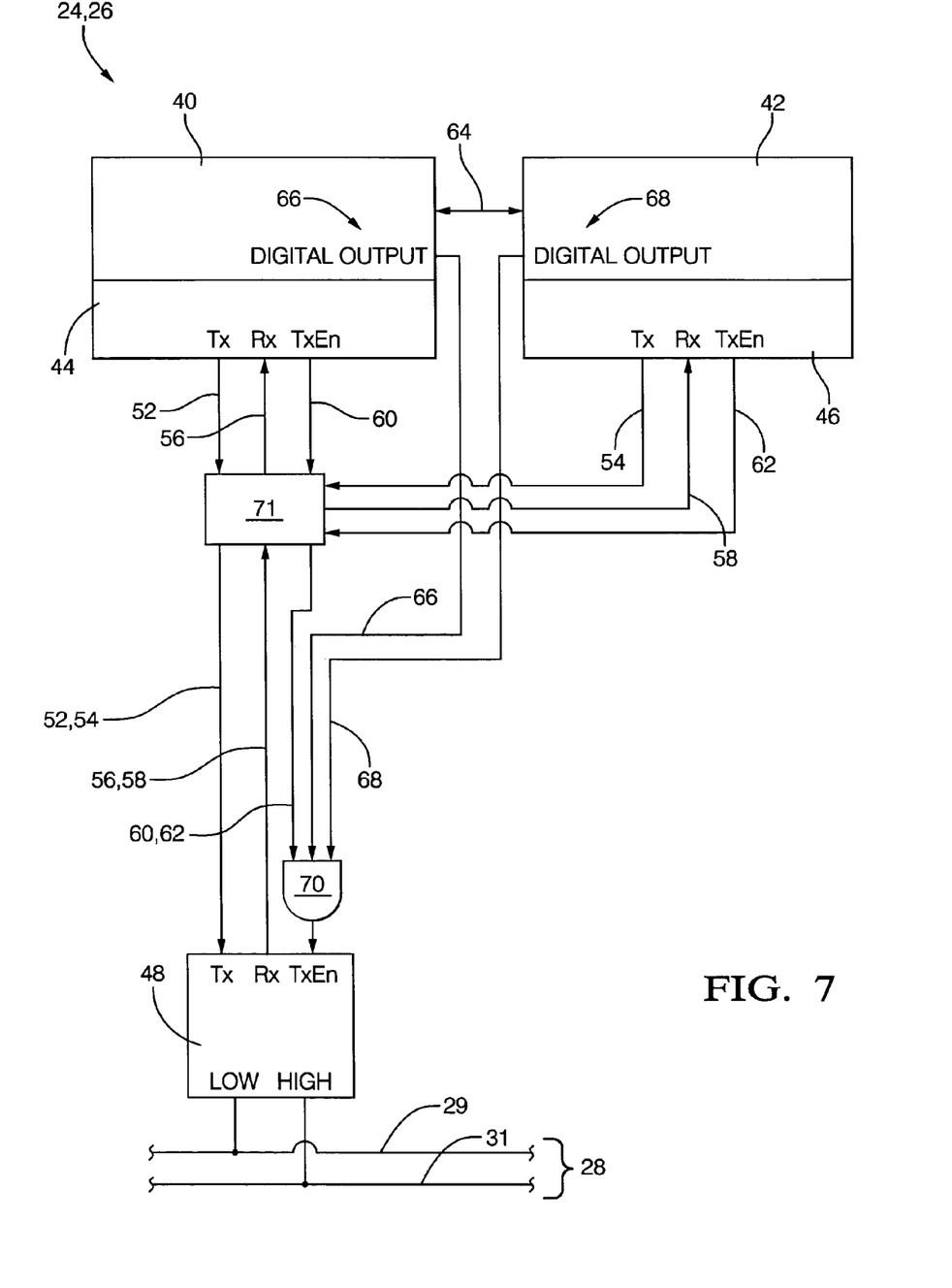
FIG. 7 is a schematic representation of a node coupled to a single channel bus and utilizing a single interface and dual outputting controllers.

FIG. 5 illustrates another, and even more simplified, node architecture. In the system of FIG. 5, rather than providing two controllers 40, 42, a single microcontroller 40' with two cores (not shown) may be utilized. In particular, this dual controller 40' may include two central processing units (CPUs) running the same code. These CPUs may have the same memory and run off of the same basic code, but independently carry out calculations and data processing functions.

In this case, the two separate cores or CPUs inside the microcontroller 40' provide only a single output in the form of a Dual CPU Fault or Digital CPU Fault 74. This Dual CPU Fault 74 is either a digital "1" or digital "0"; or, in other words, a signal of agreement or disagreement between the two cores of the microcontroller 40'. For example, if the outputs of the two cores agree (within a specified limit) then the output of the Dual CPU Fault 74, which is fed to the AND gates 70a, 70b, is a digital "1". When the output of the Dual CPU Fault 74 is a "1," data transmission from the controller 40' and its communication controller 44 is allowed. In contrast, when the output of the Dual CPU Fault 74 is a "0", the output of the controller 40' is essentially shut down due to the low signal provided to the AND gates 70a, 70b and forwarded to the transceivers 48a, 48b.

In the embodiment of FIG. 5, a simple, single bus interface (to each channel) is provided, and cost savings are provided by utilizing only a single microcontroller 40'. However, because the cores of the microcontroller 40' may utilize the same code and memory, independence between the two controllers/controller portions is sacrificed, and fault detection may be less complete.

In addition, because the system of FIG. 5 does not include a separate supervisory controller, the system may not be able to monitor correctness of the data on the bus 28 in the time domain (i.e., monitor an expected timing pattern). However, if desired the microcontroller 40', or its co-processor, can be programmed to monitor correctness of the data in the time domain.

The node architecture of the present invention can also be used with a time-triggered protocol bus, rather than an event triggered bus. A time triggered bus allots each node 24, 26 (or controller 40, 42), a specific, predefined window or slice of time in which that node or controller can transmit its data to the bus 28, and thereby to the other nodes or controllers. This time slot may be short as one-tenth of a millisecond or even shorter. Each node or controller may have its own internal clock or timer which can be synchronized with other clocks or timers in the system so that the node or controller knows when its time window is open. When each node or controller is not transmitting its data during its specified time slot or time slice, that node or controller is in a "listening" state and receives data placed on the bus 28 by the other nodes or controllers.

A bus guardian (not shown) may be provided, and may be considered part of the main bus 28. The bus guardian maintains its own clock that is separate from the clock of the nodes or controllers, although the clock of the bus guardian and the clock of the nodes or controllers may be synchronized. The bus guardian monitors communication on the main bus 28. In particular, the bus guardian monitors the form of the data provided on the main bus 28 by the various nodes or controllers and ensures that the nodes/controllers place their data on the bus 28 at the proper time.

The bus guardian ensures that the nodes/controllers place their data on the bus 28 at the proper time through the functionality of the associated transmit enable lines. Thus the bus guardian identifies and/or corrects deadline violations and ensures correctness of the data placed on the bus 28 in the time domain (i.e., ensures that the data is placed in its correct time slot). The fail-silent node structure outlined herein seeks to ensure correctness of the data placed on the bus 28 in the value domain.

For example, with respect to the embodiment shown in FIG. 2, when the time window is appropriate for the main 40 or supervisory 42 controller to provide its data to the main bus 28 (as informed by the clock of that controller 40, 42), the associated communication controller 44, 46 sends the appropriate signal over the associated transmit enable signal lines 60a, 60b or 62a, 62b. The transmit enable signals 60a, 60b or 62a, 62b are (during normal operation) sent to the associated transceivers 48a, 48b, 50a, 50b and signals that the time window for that communication controller 44, 46 is open and that communication controller 44, 46 is or will transmit data over the transmit line 52a, 52b or 54a, 54b for forwarding to the main bus 28. After a predetermined time has elapsed, the time window in which the controller can transmit data closes. At the time when the time window is closed, the associated transmit enable line 52a, 52b or 54a, 54b is switched to an "off" state.

The node architecture of the present invention may also be utilized with a bus having only a single channel (for either an event trigger or a time triggered bus). For example, FIGS. 6-9 illustrate nodes analogous to FIGS. 2-5 discussed above, with the exception that the bus 28 includes only a single channel. FIGS. 6-9 use reference numbers that correspond to those utilized above for FIGS. 2-5 to connote analogous components. In this case, the transceivers 48b, 50b (along with all of the associated transmit 52b, 54b, receive 56b, 58b, and transmit enable lines 60b, 62b) can be eliminated.

Figure 8:
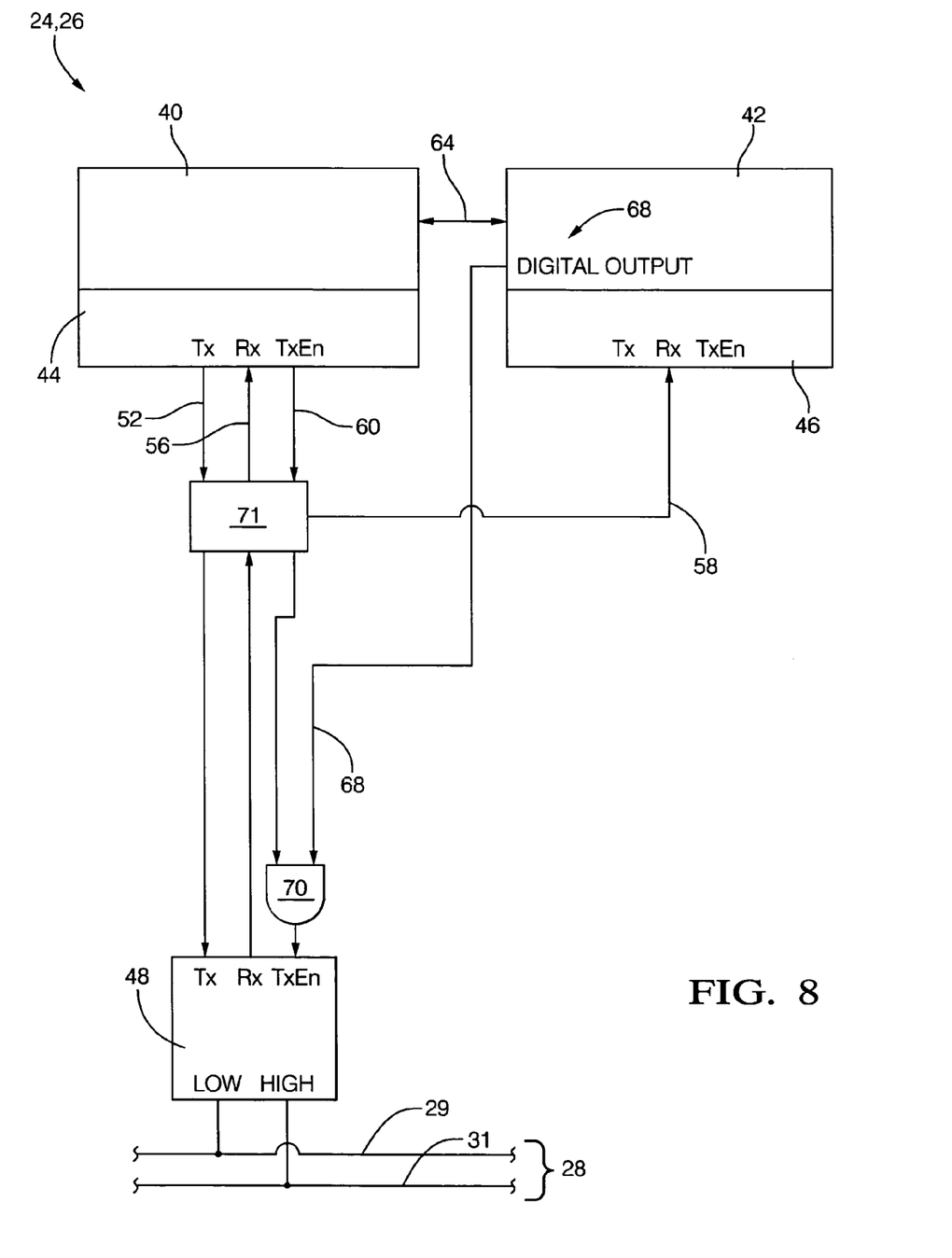
FIG. 8 is a schematic representation of a node coupled to a single channel bus and utilizing a single interface with two controllers, only one of which is an outputting controller.

When the embodiment of FIGS. 4 and 8 are utilized with a time triggered bus, as noted above the supervisory controller 42 does not provide any data to the data bus 28. However, the supervisory controller 42 and its associated communication controller 46 may participate in the time synchronization with the data bus 28 in order to understand the source and type of data which is received from the data bus 28. In the embodiment shown in FIGS. 4 and 8 (as well as the embodiment shown in FIGS. 2, 3, 6 and 7), the supervisory controller 42 may provide full or partial bus guardian functionality. When the supervisory controller 42 provides full bus guardian functionality there is no need for an external bus guardian, or for an integrated bus guardian in the communication controllers 44, 46 or in the bus driver. Instead, the CPU of the supervisory controller 42 can be utilized to provide the full bus guardian functionality and monitor the main controller 40 to ensure correctness of data in both the value and time domains.

Figure 9:
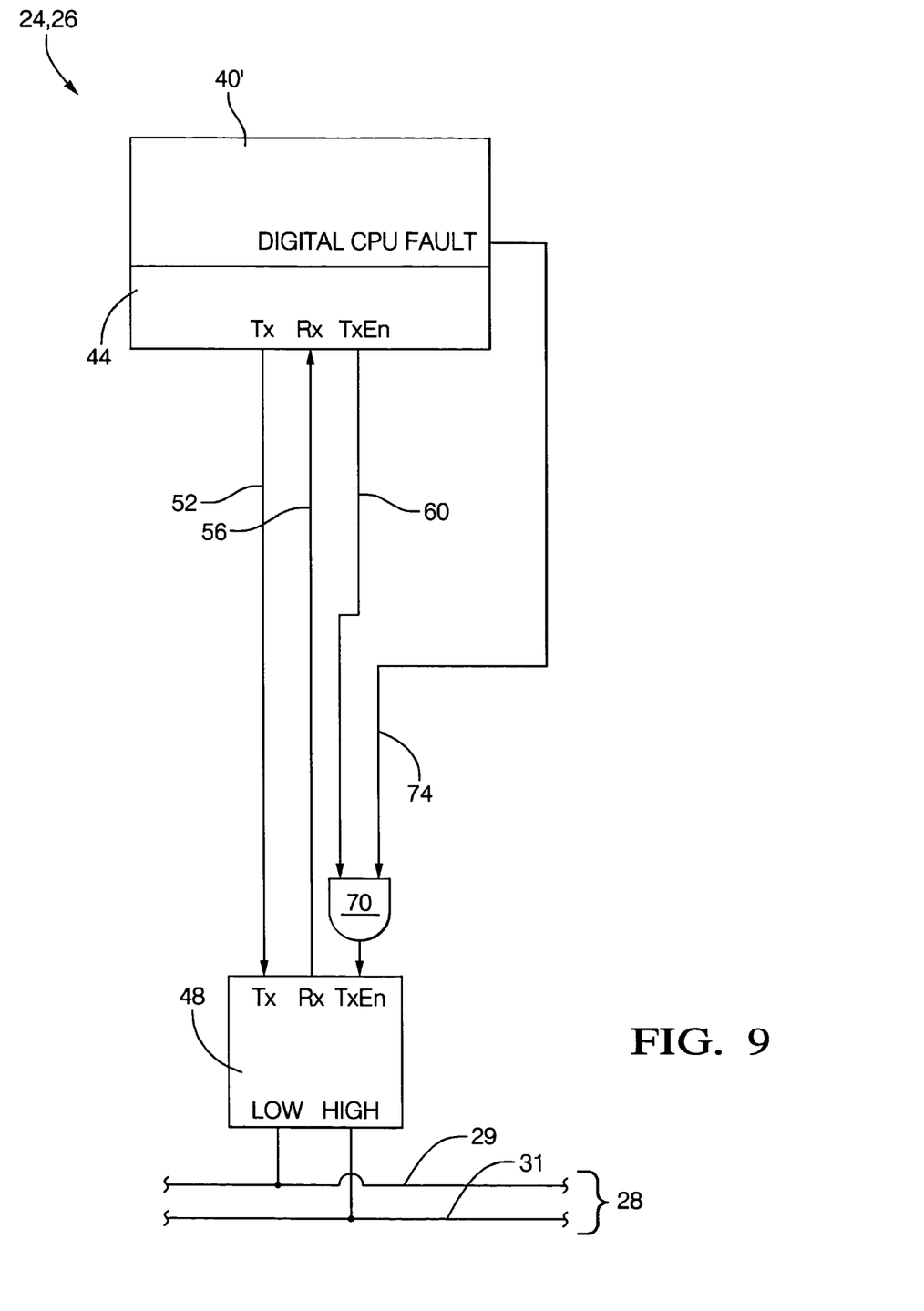
FIG. 9 is a schematic representation of a node coupled to a single channel bus and utilizing a single interface and a single controller.

The system of FIGS. 5 and 9 may need a separate bus guardian, as the bus guardian cannot necessarily be implemented in the controller 40'.

It should be understood that the various conventions and methods of transmitting data herein can be modified without departing from the scope of the invention. For example, the various conventions involving high and low signals may be varied from the specific examples shown herein. In particular, a digital "1" (rather than a digital "0") may be utilized as a signal fed to the AND gates to signal disagreement and shut down transmissions. Furthermore, the method and mechanisms used to transmit data can vary from the specific low 29 and high 31 lines of the bus 28 shown herein without departing from the scope of the invention. Further, the logical structure and connections (such as the AND gates) can be varied from that shown herein while still providing the same fail-silent functionality. For example, OR gates, NOR gates, NAND gates, various combinations of AND and other logical gates and the like may be utilized.

In addition, the control and operation of the transmit enable lines can be varied as desired. For example, as described above the transmit enable lines may be switched "on" when the time window for a node opens, or when the node is ready to transmit data. However, the transmit enable lines can also be operated to provide various other functionalities. For example, when a node is reset or refreshed, both controller or controller portions may need to communicate with each other to ensure that each controller/controller portion is up and operating properly.

During this calibration/reset period the transmit enable lines may be switched off (i.e. by the digital outputs) to ensure that no data is transmitted to the bus during this time. There can also be various other occasions or reasons why transmissions/communications from a node or controller may be desired to be blocked or overridden, and thus the transmit enable lines may have application specific timing requirements. Of course, the logic circuitry can be adjusted as desired to accommodate the desired functionality.

Having described the invention in detail and by reference to the preferred embodiments, it will be apparent that modifications and variations thereof are possible without departing from the scope of the invention.

What is claimed is:

1. A system, comprising:
    a central node including a first microcontroller and a second microcontroller separate from the first microcontroller;
    one or more subsystem nodes disposed at one or more subsystems, and a single subsystem node is disposed at a single subsystem, and each subsystem node includes a first microcontroller and a second microcontroller separate from the first microcontroller;
    a data bus connecting the central node with each subsystem node;
    wherein the first microcontroller and the second microcontroller in each node are configured to output data to the bus, or receive data from the bus, or output data to and receive data from the bus, and to provide control signals, and wherein the second microcontroller in each node is configured to monitor the output data to the bus of the first microcontroller in each node and wherein the second microcontroller in each node is configured such that if the second microcontroller in each node determines that the first microcontroller in each node is providing improper output data to the bus, at least part of the output data to the bus of the first microcontroller in each node is nullified, overridden or superseded by a nullification output from the second microcontroller in each node.

2. The system of claim 1 wherein both the first microcontroller and the second microcontroller in each node receive data from the bus and carry out calculations upon the received data from the bus, and wherein the second microcontroller in each node determines whether the first microcontroller in each node is providing improper output data to the bus by comparing the results of the calculations.

3. The system of claim 1 wherein the first microcontroller and the second microcontroller in each node are each configured to directly provide output data to the bus, or directly receive data from the bus, or directly provide output data to and directly receive data from the bus.

4. The system of claim 1 wherein the first microcontroller and the second microcontroller in each node are each configured to directly provide output data to the bus and directly receive data from the bus.

5. The system of claim 1 wherein said first microcontroller in each node is configured to directly provide output data to and directly receive data directly from said bus, and wherein said second microcontroller in each node is not configured to directly provide output data to the bus but is configured to directly receive data from said bus.

6. The system of claim 1 wherein the first microcontroller is configured to monitor the output data to the bus of the second microcontroller and the second microcontroller is configured to monitor the output data to the bus of the first microcontroller in each node, and wherein the node is configured such that if the first microcontroller determines that the second microcontroller is providing improper output data to the bus, the output data to the bus of the second microcontroller is nullified, overridden or superseded by the nullification output of the first microcontroller and if the second microcontroller determines that the first microcontroller is providing improper output data to the bus, the output data to the bus of the first microcontroller is nullified, overridden or superseded by the nullification output of the second microcontroller.

7. The system of claim 6 wherein both the first microcontroller and the second microcontroller in each node receive data from the bus and carry out calculations upon the received data from the bus, and wherein the first microcontroller determines whether the second microcontroller is providing improper output data to the bus by comparing the results of the calculations and the second microcontroller determines whether the first microcontroller is providing improper output data to the bus by comparing the results of the calculations.

8. The system of claim 1 wherein each node is configured to function normally when the output data to the bus of any other node is at least partially nullified, overridden or superseded.

9. The system of claim 1 wherein each node includes a digital logic block operatively coupled to the first microcontroller and a digital logic block operatively coupled to the second microcontroller, wherein said digital logic blocks route appropriate signals to and from the first microcontroller and the second microcontroller.

10. The system of claim 1 wherein each microcontroller in each node includes or is operatively coupled to a communication controller which is configured to accumulate data from an associated microcontroller.

11. The system of claim 10 wherein each node includes at least one transceiver configured to transmit data between at least one of said communication controllers and said bus.

12. The system of claim 11 wherein said transceiver is coupled to said communication controller via a transmit line, a receive line, and a transmit enable line.

13. The system of claim 10 wherein each node includes a pair of transceivers that are operatively coupled to a dual channel bus, wherein at least one pair of transceivers is configured to provide data to the bus from at least one of said communication controllers.

14. The system of claim 1 wherein the second microcontroller is configured to provide an agreement signal indicating whether there is agreement between the first microcontroller and the second microcontroller.

15. The system of claim 14 wherein the agreement signal is a digital signal provided to logic circuitry.

16. The system of claim 15 wherein an output of said logic circuitry is coupled to a transceiver.

17. The system of claim 1 wherein the first microcontroller is configured to provide an agreement signal indicating whether there is agreement between the first microcontroller and the second microcontroller, and the second microcontroller is configured to provide an agreement signal indicating whether there is agreement between the second microcontroller and the first microcontroller.

18. The system of claim 1 wherein each node includes the first microcontroller directly coupled to the second microcontroller such that an output of the first microcontroller is directly transmitted to the second microcontroller and an output of the second microcontroller is directly transmitted to the first microcontroller.

19. The system of claim 1 wherein the first microcontroller and the second microcontroller in each node each have about the same processing capabilities.

20. The system of claim 1 wherein the first microcontroller and the second microcontroller in each node each have significantly different processing capabilities.

21. The system of claim 1 wherein said bus is a time triggered bus.

22. The system of claim 1 wherein said bus is an event triggered bus.

23. The system of claim 1 wherein said bus is a dual channel bus.

24. The system of claim 1 wherein the second microcontroller is configured to monitor the timing of the output data to the bus of the first microcontroller and wherein the second microcontroller is configured to determine that the first microcontroller is providing improper data to the bus at least partially based upon the timing of the output data to the bus of the first microcontroller.

25. The system of claim 1 wherein the second microcontroller is configured to monitor only part of the output data to the bus of the first microcontroller.

26. The system of claim 1 wherein a first microcontroller portion and a second microcontroller portion are part of the first microcontroller and the portions are utilized to independently carry out calculations and data processing functions.

27. The system of claim 26 wherein the first microcontroller portion and the second microcontroller portion are configured to each directly provide output data to said bus, or directly receive data from said bus, or directly provide output data to and directly receive data from said bus.

28. The system of claim 26 wherein the second microcontroller portion is configured to monitor the first microcontroller portion and wherein if the second microcontroller portion determines that the first microcontroller portion is providing improper output data to the bus, the output data to the bus of the first microcontroller portion is nullified, overridden or superseded by the nullification output of the second microcontroller portion.

29. The system of claim 26 wherein the second microcontroller portion is configured to monitor the timing of the output data to the bus of the first microcontroller portion and wherein the second microcontroller portion is configured to determine that the first microcontroller portion is providing improper data to the bus at least partially based upon the timing of the output data to the bus of the first microcontroller portion.

30. The system of claim 1 wherein said nullification output does not nullify, override, or supersede any of said control signals.

31. The system of claim 1 wherein said output data to the bus of the first microcontroller is nullified, overridden or superseded on a selective, case-by-case basis such that subsequent output data to the bus of the first microcontroller that is not determined to be improper is not nullified, overridden or superseded by the by the nullification output of the second microcontroller.

32. The system of claim 1 wherein the bus connecting each node comprises a topology and the topology is at least one of:
   (i) a star configuration; and
   (ii) a ring configuration.

33. The system of claim 1 wherein each node is configured such that the first microcontroller and the second microcontroller each output valid output data to the bus or no data to the bus at all.

34. The system of claim 1 wherein the system is at least one of:
   (i) a steer-by-wire system;
   (ii) a throttle-by-wire system;
   (iii) a suspension system; and
   (iv) a brake system.

35. The system of claim 34 wherein the system is disposed in apparatus utilized in transportation, said apparatus includes one or more wheels rotationally coupled to a frame of said apparatus, and wherein each subsystem node is configured to process data relating to the control of each subsystem on said apparatus and the central node is configured to process data relating to control of the system that includes each subsystem.

36. The system of claim 35 wherein the system is the brake system disposed on a vehicle and said brake system includes brake subsystems, comprising:
- a central node disposed in the vehicle;
- a first brake subsystem node disposed at a first wheel;
- a second brake subsystem node disposed at a second wheel;
- a third brake subsystem node disposed at a third wheel;
- a forth brake subsystem node disposed a forth wheel; and
- a data bus connecting the central node to each brake subsystem node; wherein each brake subsystem node is operatively coupled to only a single associated brake subsystem at each wheel such that the control signals of each associated brake subsystem node relates to control of the single associated brake subsystem at each wheel.

37. The system of claim 36 wherein each brake subsystem node includes said control signals that constitute signals directly related to the actuation of at least one of a motor and a motor driver at the associated brake subsystem.

38. The system of claim 37 wherein said output data to the bus at each brake subsystem node provides information relating to conditions and components of the corresponding associated brake subsystem that is not directly related to the actuation of at least one of the motor and the motor driver at the corresponding single associated brake system.

39. The system of claim 36 wherein each brake subsystem node is directly coupled to at least one of a motor and a motor driver at the associated brake subsystem.

* * * * *